United States Patent [19]

Suzuki et al.

[11] Patent Number: 4,594,638
[45] Date of Patent: Jun. 10, 1986

[54] LIQUID LEAK SENSOR

[75] Inventors: Hirosuke Suzuki, Tokorozawa; Satoru Kobayashi; Katsuo Shimosawa, both of Hitaka, all of Japan

[73] Assignee: Junkosha Co. Ltd., Tokyo, Japan

[21] Appl. No.: 670,541

[22] Filed: Nov. 13, 1984

[30] Foreign Application Priority Data

Nov. 18, 1983 [JP] Japan ............................ 58-178857[U]

[51] Int. Cl.$^4$ ........................ H01G 7/00; H02G 15/28
[52] U.S. Cl. .................................... 361/280; 174/11 R
[58] Field of Search ............... 361/280, 284, 285, 286; 324/61 R; 174/11 R

[56] References Cited

U.S. PATENT DOCUMENTS

| 2,056,085 | 9/1936 | Alles | 174/11 R UX |
| 4,029,889 | 6/1977 | Mizuochi | 324/61 R UX |
| 4,386,231 | 5/1983 | Vokey | 174/11 R X |

Primary Examiner—Donald A. Griffin
Attorney, Agent, or Firm—Mortenson & Uebler

[57] ABSTRACT

A liquid leak detecting sensor in the form of a coaxial cable assembly is provided in which means are provided for enhancing the passage of leaks from the outer surface of the outer conductor into the sensing layer which separates the inner and outer conductors. The change in permittivity of the sensing layer caused by the leak enables rapid detection of the location of the leak along the cable.

8 Claims, 5 Drawing Figures

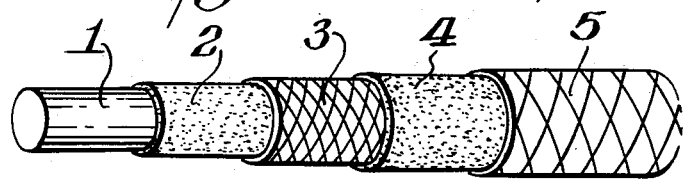
Fig. 1 (Prior Art)
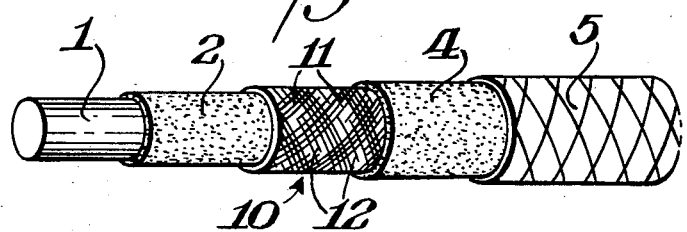
Fig. 2.
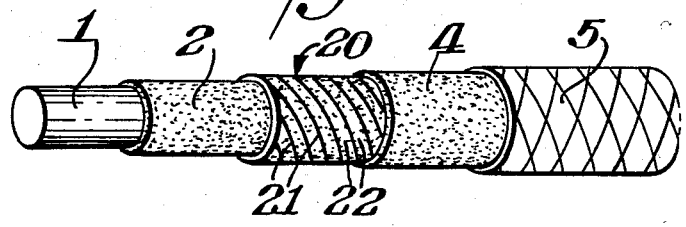
Fig. 3.
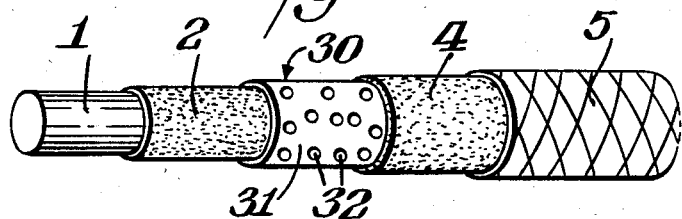
Fig. 4.
Fig. 5.
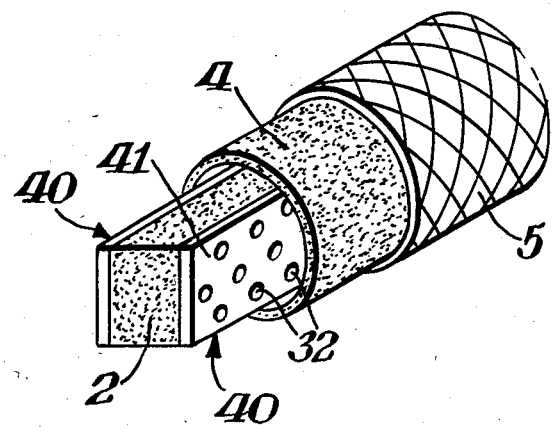

LIQUID LEAK SENSOR

BACKGROUND OF THE INVENTION

This invention relates to a coaxial cable type of sensor for detecting the leakage of a liquid and, more particularly, to a liquid leakage sensor capable of detecting the leakage of a liquid more quickly than sensors of the prior art and capable of reducing variations in the time required for the detection thereof.

Heretofore, oils such as crude oil, petroleum, gasoline, kerosene, organic solvents, chemicals and the like have been transported from one place to another through underground piping. Various methods have been proposed for detecting leakage in pipes in these liquid transportation systems. One of the methods proposed, for example, comprises installing along a pipeline a pair of conductors separated from each other by an insulating material which is porous to the liquid being transported and allows passage of the liquid therethrough causing the electrical characteristics between the conductors to change when the liquid leaks out of the pipe and enables one to detect the place where the liquid is leaking.

In the aforementioned method, a liquid leakage sensor comprising a pair of coaxial conductors has been used as shown in FIG. 1. Therein, an internal conductor 1 and an external braided metallic conductor 3 which is porous to the liquid to be detected is shown, the conductors being arranged coaxially, and a porous insulator 2 of continuously porous polytetrafluoroethylene (PTFE) and the like is provided as a detector layer between the conductors. A protective polyester braid 5 is provided and acts as a protective layer on the periphery of the external braided conductor 3. In the liquid leakage sensor thus constructed, a leak of a liquid such as petroleum passes through the external braid 5 and porous PTFE insulator 4, through the openings in the braid of conductor 3, and permeates through the internal porous PTFE insulator 2 used as a detector layer, causing the relative permittivity of the detector layer 2 to change. Such a detector was the subject of a prior patent application of the present inventors, which was published as Japanese Patent Application Laid-Open Gazette No. 54-15435 and registered as Patent No. 984263. Such a liquid leakage sensor was capable of detecting liquid leakage by measuring the change in permittivity or by means of a pulse reflection distortion based on the change in the permittivity. The liquid leakage sensor thus contructed offered capabilities allowing for the position and range of leakage to be detected, the types of oils to be distinguished to a certain degree, and oil and water to be selectively differentiated. However, the prior art detector still has drawbacks in that 20 to 100 minutes can be required to detect oil leakage and there are variations in detection time in the longitudinal direction of the cable.

In view of the aforementioned problems, it is an object of the present invention to provide a liquid leakage sensor capable of detecting leakage quickly and minimizing variations in detection time in the longitudinal direction.

SUMMARY OF THE INVENTION

An improved liquid leakage sensor is provided comprising at least two electrical conductors in substantially parallel relationship with each other and having a porous detector layer between the conductors and adjacent to both, the permittivity of the detector layer being measurably changed by the entry of liquid into the detector layer, at least one of the conductors being permeable to the liquid, the improvement comprising the permeable conductor constructed of at least one electrical conducting member and at least one member which enhances passage of liquid through the permeable conductor. The permeable conductor may be a braided construction braided over the detector layer in coaxial construction with respect to the other conductor and, in this embodiment, the member which enhances passage of liquid is constructed of a continuously porous plastic material and the braided construction is a mixed braid of metallic wires and porous plastic strands preferably porous polytetrafluoroethylene strands. In another embodiment, the permeable conductor may be a spirally wrapped construction wrapped over the detector layer in a coaxial construction with respect to the other conductor and the permeable conductor is preferably constructed as a metal wire helically wound around the detector layer adjacent to a tape of a porous plastic helically wound about the detector layer, the tape preferably being polytetrafluoroethylene. The member which enhances passage of liquid may also be a granular substance. The conductors may be arranged coaxially and the member which enhances passage of liquid may be a cylindrical metal member having openings allowing liquid to pass therethrough, the openings being filled with the granular substance which preferably is polytetrafluoroethylene fine powder.

BRIEF DESCRIPTION OF THE DRAWINGS

FIG. 1 is a perspective view, partly in cross-section, of a leak detector of the prior art.

FIGS. 2–5 are perspective views, partly in cross-section, of different embodiments of liquid leak detectors according to the present invention.

DETAILED DESCRIPTION OF THE INVENTION AND PREFERRED EMBODIMENTS WITH REFERENCE TO THE DRAWINGS

A liquid leak detecting sensor in the form of a coaxial cable assembly is provided in which means are provided for enhancing the passage of leaks from the outer surface of the outer conductor into the sensing layer which separates the inner and outer conductors. The change in permittivity of the sensing layer caused by the leak enables rapid detection of the location of the leak along the cable.

The present invention attempted to remedy the shortcomings of the prior art sensors and found that the storage of leakage liquid in openings in the external braided metallic conductor layer was attributed to the gaps among the metal wires constituting the braid and formed the determining cause of the variations in detection time and caused long detection times.

In a liquid leakage sensor comprising a plurality of conductors arranged substantially parallel with each other and a porous detector layer sandwiched between the conductors for electrically separating one from the other, the permittivity of said detector layer being caused to change by liquid leakage, an improvement is provided comprising providing the external braided conductor whose layer is porous to the liquid to be detected with a component which enhances passage of the liquid into the detector layer so that the storage of the leaking liquid in the braided conductor in its initial as well as later stages may be substantially prevented. Because the leaking liquid arriving at the detector layer quickly permeates through the detector layer, the time required for detecting the liquid leak is largely shortened and the time for detecting a liquid leak in the near or far stages of the detector becomes roughly constant depending upon the quality of the member having a component which enhances passage of the liquid into the detection layer. As a result, variations (lack of uniformity) in the time required for detecting liquid leaks are minimized.

Referring to the drawings, the present invention will be described in detail. The following are preferred embodiments of the disclosed invention and various changes and modifications may be made in the invention without departing from the spirit and scope thereof.

FIG. 2 is a perspective view, partly in cross-section, for illustrating a first example of the present invention. In this example, the arrangement comprising internal conductor 1 of a silver-plated copper wire 3 mm in diameter, a detection layer 2 prepared by winding unsintered continuously porous expanded PTFE tape, 2.175 mm thick, around the internal conductor 1 by helically rolling the tape 1.5 times, about the conductor 1 along its length, and a conductor layer 10 which is porous to the liquid to be detected and having a component member for enhancing passage of the liquid prepared by making a combination of two strands twisted together, twisting 16 of these into a bundle and alternately braiding the bundles to obtain a braid comprising a bundle formed with a combination of fine copper wires 11 which are each 0.18 mm in diameter and a continuously porous PTFE tape 12 which is 0.06 mm thick and 3.18 mm wide, which was obtained by stretching extruded PTFE tape three times and sintering the tape, the conductor layer 10 being provided on the periphery of the detector layer 2. Essentially, the outer conductor layer 10 comprises a mixed braid of metallic fine wires 11 and porous PTFE strands 12. Subsequently, protective layer 4 of an unsintered, continuously porous PTFE tape helically wound 1.5 times over the conductor layer 10 to a thickness of 0.8 mm and a protective over-braid 5 formed with a net of polyester thread having 0.6 mm diameter strands was provided thereon to complete the liquid leakage sensor according to this embodiment.

Another liquid leakage sensor as a second example was made which was similar in construction to the first example except that the member 12 for enhancing passage of the liquid was replaced with one formed with a filament made of unsintered continuous PTFE tape extended 1.5 times, the tape being 0.12 mm thick and 3.18 mm wide.

The following table shows the test results obtained by measuring the time required for detecting kerosene leakage with the above-described examples 1 and 2 of liquid leakage sensors and a conventional sensor having an external braided conductor 3 totally formed with 32 braided fine copper wires.

| Measuring/Liquid item: sensor used: | Example 1: | Example 2: | Conventional sensor: |
|---|---|---|---|
| Characteristic impedance (Ω) | 50 | 50 | 50 |
| Detection time (min)*: | 5.07 | 6.51 | 80.90 |

-continued

| Measuring/Liquid item: sensor used: | Example 1: | Example 2: | Conventional sensor: |
|---|---|---|---|
| Variations in detection time for every 10 m (min): | 0.28 | 0.75 | 20.40 |

*Time required until characteristic impedance decreases by 5Ω at 30° C.

As is apparent from this table, the liquid leakage sensors according to the present invention provided excellent results in that they were capable of saving considerable time required for detecting liquid leaks and reducing variations in the time required to detect leaks along the longitudinal direction of the sensors. Moreover, the amount of leakage of electromagnetic waves and attenuation did not increase after the improvements. Such improvements were observed when expanded, sintered continuously porous PTFE thread instead of the continuously porous PTFE tape was used as the member 12 for enhancing passage of the liquid.

Although the member 12 for enhancing passage of the liquid was formed with a tape or thread, i.e., a PTFE strand and a copper wire each were made into bundles in the above-described examples and they were alternately braided in parallel, the conductor 10 may be formed of a braid using another mixture of metal wire such as a copper wire and PTFE strands. It is also possible to change the shape or size of the PTFE strand and the metal wire, or the number of them.

Preparation of the member for enhancing passage of the liquid from a strand facilitates and economizes the provision of such a member. Moreover, use of a continuously porous plastic material as the strand is further effective for this purpose because both the peripheral portion and the inside of its construction may be used as a passageway for the liquid. Among the continuous porous plastic materials, continuously porous PTFE is stable physically and chemically and is preferred. Unsintered, partially sintered and sintered materials may be made of continuously porous PTFE and any one of these may be used. The sintered material is most suitable for the purpose of the present invention.

Preparation of the continuously porous PTFE and the production of its unsintered, partially sintered and sintered materials have been disclosed in Japanese Patent No. 51-18991, Japanese Patent Application Laid-Open, Gazette Nos. 50-22881 and 53-99955.

In addition, a thermoplastic fluorocarbon resin such as FEP, PFA or a color pigment may be premixed in with the PTFE. Use of the reinforced plastic may be effective to some extent and such a plastic material can be produced at less cost. Use of a strand made of sintered PTFE may enhance its mechanical strength and stabilize its physical and chemical properties.

As shown in FIG. 3, it is also possible to wind a conductor 21 such as a copper wire on the periphery of the detection layer 2 without using the braided conductor layer 10 and to arrange the tape member 22 for enhancing passage of the liquid formed with a strand adjacent to the conductor 21 as shown. In this case, the preparation of the conductor layer 20 porous to the liquid is easier than the case of forming a braid. In FIG. 3, like elements are given like reference characters of FIG. 2.

In the above-described sensor it is desirable that the members for enhancing the liquid passage provided on the conductor layer porous to the liquid be, in view of durability and detection time and the like, various continuously porous plastic tapes or threads as those made of the continuously porous PTFE. In addition, natural fibers such as cotton yarn and reinforced plastic tapes or threads may be used to produce liquid leakage sensors which are less costly. Moreover, the continuously porous PTFE is preferred as the continuously porous member for enhancing the liquid passage when reliability and short detection time are important considerations.

As shown in FIG. 4, in the case of a liquid leakage sensor having a coaxial construction, a cylindrical metal body 31 made of copper and having a number of small openings for enhancing passage of the liquid may be used as the conductor porous to the liquid. Further, a conductor layer 30 porous to the liquid so constructed that the openings are filled with granular plastic members 32 for enhancing passage of the liquid may also be used. In this case, like elements are given like reference characters. Although other granular members 32 for introducing the liquid having various properties may be usable, unsintered PTFE fine resin powder is preferred in view of its durability and processibility. Although not shown, the openings for introducing the liquid may be filled with the granular members 32 for introducing the liquid after winding a metal strip such as a copper tape having a number of openings spirally around the periphery of the detection layer 2 without using the cylindrical body 31.

When the granular members 32 are used, selective permeability is provided and this makes it unnecessary to separately install a protective or selective layer permeable to the liquid and it becomes possible to improve the liquid pressure resistance of the sensor.

In the liquid sensor of FIG. 1, gaps among the metal wires of the external braided conductor 3 may be filled with the granular members 32 for introducing the liquid. On the other hand, instead of the strand in the example of FIG. 3 or together therewith, the granular members for introducing the liquid may be used to fill the openings. In particular, it is preferred to use the PTFE fine powder resin as the member for introducing the liquid in view of its ease of workability. As in the case of the first and second examples where gaps are provided over the whole conductor layer porous to the liquid prepared from the braided mixture of metal wire and strand, the gaps may be filled with particulate grains including PTFE fine resin powder.

In the above examples, liquid leakage sensors each having a coaxial construction have been described. However, as shown in FIG. 5, a pair of ribbon-like metal conductors 41 having a number of openings for introducing the liquid may be arranged in parallel so as to sandwich a porous detection layer 2 therebetween wherein conductor layer 40 is prepared by filling the openings therein with the granular member 32 and wherein a continuously porous insulator 4 and a protective braid 5 are installed on the periphery thereof. In FIG. 5, like elements are given like reference characters of FIG. 2.

For the detection and protective layers employed in the liquid leakage sensors according to the present invention, materials having a porous microstructure provided with a number of fine continuous pores as an internal structure prepared from plastics such as polyethylene and polypropylene by the known extrusion/stretching, salt/leaching and solvent volatilization methods and the like may be used in addition to the expanded, continuously porous PTFE tape.

As above described, a liquid leakage sensor is provided comprising a plurality of conductors arranged substantially parallel with each other and having a detector layer sandwiched between the conductors, the permittivity of the detector layer being caused to change by a liquid leakage, the improvement comprising providing a conductor whose layer is porous to the liquid being detected with a member for enhancing passage of the liquid into the detector layer, so that the time required for detecting a liquid leak is shortened and variations in the time required for detecting the liquid leak are minimized. Moreover, because the time required can be shortened, it becomes possible to increase the thickness of a protective layer to be provided on the periphery of the conductor layer porous to the liquid and, when the liquid leakage sensor is covered with water, prevent (improve in water pressure resistance) reduction in electrical insulating resistance which is apt to occur between the conductor and the outside, whereby conductor erosion is minimized while the mechanical protective capability can be improved. In this case, the reduction in insulating resistance and conductor erosion will be further effectively provided by using a conductor precoated with plastics and the like for insulation.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. An improved liquid leakage sensor comprising at least two electrical conductors in substantially parallel relationship with each other and having a detector layer between said conductors and adjacent to both, the permittivity of said detector layer being measurably changed by the entry of said liquid into said detector layer, at least one of said conductors being permeable to said liquid, the improvement comprising said permeable conductor constructed of at least one electrical conducting member and at least one member which enhances passage of said liquid through said permeable conductor, wherein said permeable conductor is a braided construction braided over said detector layer in coaxial construction with respect to the other conductor, and wherein said braided construction is a mixed braid of metallic wires and porous plastic strands.

2. The sensor of claim 1 wherein said braided construction comprises a mixed braid of electrically conductive metallic wires braided with strands of a continuously porous plastic material.

3. An improved liquid leakage sensor comprising at least two electrical conductors in substantially parallel relationship with each other and having a detector layer between said conductors and adjacent to both, the permittivity of said detector layer being measurably changed by the entry of said liquid into said detector layer, at least one of said conductors being permeable to said liquid, the improvement comprising said permeable conductor constructed of at least one electrical conducting member and at least one member which enhances passage of said liquid through said permeable conductor, wherein said permeable conductor is constructed as a metal wire helically wound around said detector layer adjacent to a tape of a porous plastic helically wound about said detector layer.

4. An improved liquid leakage sensor comprising at least two electrical conductors in substantially parallel relationship with each other and having a detector layer between said conductors and adjacent to both, the permittivity of said detector layer being measurably changed by the entry of said liquid into said detector layer, at least one of said conductors being permeable to said liquid, the improvement comprising said permeable conductor constructed of at least one electrical conducting member and at least one member which enhances passage of said liquid through said permeable conductor, wherein said member which enhances passage of said liquid is a granular substance.

5. The sensor of claim 4 wherein said conductors are arranged coaxially and said member which enhances passage of said liquid is a cylindrical metal member having openings allowing said liquid to pass therethrough, said openings filled with said granular substance.

6. The sensor of claim 4 wherein said conductors are arranged coaxially and said permeable conductor is a metal strip spirally wound about said detector layer, said strip having openings therethrough filled with said granular substance.

7. The sensor of claim 4 wherein a pair of tape-like metal strips are arranged on opposite sides of said detector layer, one of said pair of metal strips having openings therethrough filled with said granular substance.

8. The sensor of claim 4, 5, 6 or 7 wherein said granular substance is polytetrafluoroethylene fine powder.

* * * * *